United States Patent Office 3,399,155
Patented Aug. 27, 1968

3,399,155
BLENDS OF RIGID VINYL CHLORIDE POLYMERS AND NON-POLAR ELASTOMERS
Massimo Baer, Longmeadow, and Ernest H. Hankey, Springfield, Mass., assignors to Monsanto Company, a corporation of Delaware
No Drawing. Continuation-in-part of application Ser. No. 256,244, Feb. 5, 1963, which is a division of application Ser. No. 800,911, Mar. 23, 1959, now Patent No. 3,085,082. This application May 19, 1966, Ser. No. 551,250
5 Claims. (Cl. 260—23)

ABSTRACT OF THE DISCLOSURE

There are disclosed improved vinyl chloride compositions provided by a blend of a rigid vinyl chloride polymer, a non-polar hydrocarbon elastomer and a surfactant in an amount sufficient to render the non-polar hydrocarbon elastomer compatible in the vinyl chloride polymer.

---

This application is a continuation-in-part of copending application Ser. No. 256,244, filed Feb. 5, 1963, now abandoned, which in turn is a division of application Ser. No. 800,911, filed Mar. 23, 1959, now United States Patent No. 3,085,082.

The present invention relates to blends of thermoplastic polymers and more particularly to blends of a rigid vinyl chloride polymer and a hydrocarbon elastomer.

It is known that blends of rigid vinyl chloride polymers and certain diene elastomers which contain polar groups in their chemical structure have desirable physical properties. In particular, polymer blends containing 70.0 to 95.0 percent of the vinyl chloride polymer and, correspondingly, 5.0 to 30.0 percent of the diene elastomer are easily processed and have considerably higher impact strength than the rigid vinyl chloride polymer included therein. Such polymer blends are useful in the fabrication of rigid shock resistant items such as pipe, tubing, sheets, and the like. Polymer blends containing larger quantities of the elastomer, e.g., 10.0 to 80.0 percent of the vinyl chloride polymer and, correspondingly, 90.0 to 20.0 parts of the diene elastomer, are tough flexible materials which resemble rubber and/or plasticized vinyl chloride polymers in properties, but have certain definitely superior properties as compared with either rubber or conventionally plasticized vinyl chloride polymers. The diene elastomers included in the above-described polymer blends contain in their chemical structure polar groups such as chloride atoms, ester groups, nitrile groups and the like. Typical of the diene elastomers employed are polychloroprene, butadiene-acrylonitrile copolymers, butadiene-methyl isopropenyl ketone copolymers, butadiene-vinyl pyridine copolymers, butadiene-ethyl acrylate copolymers, etc.

Although blends of rigid vinyl chloride polymers and non-polar hydrocarbon elastomers such as natural rubber, polybutadiene, styrene-butadiene rubbers, polyethylene and the like are known, these polymer blends do not have physical properties which correspond to those of the polymer blends described in the paragraph above. In particular, such blends of vinyl chloride polymers and the non-polar hydrocarbon elastomers tend to be weak and cheesy. Obviously, it would be desirable to have available to the art means for preparing polymer blends of good properties from rigid vinyl chloride polymers and non-polar hydrocarbon elastomers.

It is an object of this invention to provide novel polymer compositions having good properties and which include therein a rigid vinyl chloride polymer and a non-polar hydrocarbon elastomer.

Other objects and advantages of this invention will be apparent from the following detailed description thereof.

The above and related objects are attained by preparing compositions consisting essentially of an intimate fusion blend of (1) a rigid vinyl chloride polymer, (2) a non-polar hydrocarbon elastomer, and (3) a minor but effective quantity of a third component which renders the rigid vinyl chloride polymer and the non-polar hydrocarbon elastomer more compatible and improves the physical properties, especially the impact strength, of the polymer blend. In the subsequent description of this invention, the third component of the polymer blend will be referred to as a "compatibilizing agent." The compatibilizing agent used in the practice of this invention is a surfactant or a mixture of two or more surfactants. Such polymer blends are prepared by subjecting the rigid vinyl chloride polymer, the non-polar hydrocarbon elastomer and the compatibilizing agent to an intensive mixing action at an elevated temperature.

The following examples are set forth to illustrate more clearly the principle and practice of this invention to those skilled in the art. Where parts or quantities are mentioned, they are parts or quantities by weight.

Unless otherwise noted, all of the polymer blends subsequently reported in the examples are prepared by the following standard procedure. The vinyl chloride polymer and a stabilizer therefor are worked on a two-roll rubber mill until a rolling bank is formed. Thereafter, the compatibilizing agent, the non-polar hydrocarbon elastomer and any additional components such as lubricants, fillers, etc., are added on the mill and the resulting mixture is worked for the period of time indicated in the examples. The roll temperatures are maintained at 340° Fahrenheit throughout the mixing operation. The polymer blends are heated for four minutes at 185° centigrade and then compression molded for one minute at 185° centigrade under a pressure of 4000 p.s.i. to prepare test specimens for measurement of physical properties.

EXAMPLE I

Part A

A blend of 95.0 parts of a vinyl chloride homopolymer, 5.0 parts of polyethylene, 2.0 parts of a tin stabilizer and 4.0 parts of calcium stearate is milled for twenty-five minutes and the resulting blend has an Izod impact strength of 2.4 foot pounds per inch of notch. This and all subsequently reported impact values are measured at 25° centigrade using a notching having a radius of curvature of 0.010 inch.

A blend of 95.0 parts of the same vinyl chloride homopolymer, 5.0 parts of the same polyethylene and 2.0 parts of the same tin stabilizer is milled for twenty-five minutes to prepare a control blend. This control blend has an Izod impact strength of only 1.5 foot pounds per inch of notch.

This vinyl chloride resin included in the above blends is a commercially available vinyl chloride homopolymer which has a specific viscosity of about 0.48 as measured in a 0.4 percent solution in cyclohexanone at 25° centigrade. The polyethylene included in the blends has a number average molecular weight of about 25,000 to 30,000 and a density of about 0.916 to 0.917.

Part B

Part A above is repeated except that the calcium stearate is replaced with an equivalent quantity of N,N'-distearyl ethylene diamine. The Izod impact strength of the blend is 2.2 foot pounds per inch of notch.

EXAMPLE II

A polymer blend is prepared by working the following composition for fifteen minutes on a rubber mill.

| Ingredient: | Parts |
|---|---|
| Vinyl chloride resin | 95.0 |
| Polyethylene | 5.0 |
| Titanium dioxide | 3.0 |
| Calcium stearate | 1.0 |
| N,N'-distearyl ethylene diamine | 2.0 |
| Dibutyl tin dilauryl mercaptide | 2.0 |

The vinyl chloride resin and the polyethylene employed in the above blend are described in Example I. The compatibilizing agent is the mixture of calcium stearate and the N,N'-distearyl ethylene diamine. The dibutyl tin dilauryl mercaptide functions as a sabilizer for the vinyl chloride resin and the titanium dioxide is included solely for its tinctorial properties. The Izod impact strength of the blend is 2.5 foot pounds per inch of notch.

EXAMPLE III

Part A

Thirteen polymer blends are prepared having the composition and physical properties set forth in Table I.

the sorbitan monolaurate is replaced with an equivalent quantity of glycerol monostearate. Comparable results are obtained.

EXAMPLE IV

Test specimens formed from polymer blends A–G identified in Table I are tested for chemical resistance by soaking them in, respectively, concentrated sulfuric acid, concentrated nitric acid, glacial acetic acid and kerosene for six days at 140° Fahrenheit and subsequently determining the gain in weight of the specimen. The results shown as the percent gain in weight are set forth in Table II.

TABLE II

| Polymer blend | A | B | C | D | E | F | G |
|---|---|---|---|---|---|---|---|
| Liquid: | | | | | | | |
| Conc. sulfuric acid | 0.35 | 0.25 | | 0.20 | 0.20 | 15.40 | 30.90 |
| Conc. nitric acid | 5.10 | 3.60 | 4.00 | 3.60 | 3.10 | 6.00 | 9.40 |
| Glacial acetic acid | 1.60 | 1.60 | 1.40 | 1.20 | 1.10 | 2.90 | 9.40 |
| Kerosene | 0.05 | 0.20 | 0.07 | 0.06 | 0.05 | 0.03 | 0.76 |

EXAMPLE V

A mechanical blend was prepared containing 95.0 parts of vinyl chloride homopolymer, 3.0 parts polyethylene, 2.0 parts tin mercaptide stabilizer, 3.0 parts titanium dioxide, 1.0 part calcium stearate and 2.0 parts of N,N'-distearyl ethylenediamine.

After roll milling for ten minutes, the Izod impact strength was found to be 1.8 foot pounds per inch of notch.

As earlier noted, the compositions of this invention comprise an intimate fusion blend of (a) a rigid vinyl chloride polymer, (b) a non-polar hydrocarbon elastomer that is normally incompatible with said rigid vinyl chloride

TABLE I

| Blend identification | A | B | C | D | E | F | G | H | I | J | K | L | M |
|---|---|---|---|---|---|---|---|---|---|---|---|---|---|
| Component: | | | | | | | | | | | | | |
| Vinyl chloride resin | 95 | 95 | 93 | 95 | 97 | 95 | 90 | 92 | 90 | 95 | 95 | 95 | 95 |
| Polyethylene | 5 | 5 | 7 | 5 | 3 | | | | 5 | | 5 | 5 | 5 |
| Styrene-butadiene elastomer | | | | | | 5 | 10 | 8 | | 5 | | | |
| Polybutadiene elastomer | | | | | | | | | | | | 5 | |
| Sorbitan monolaurate | 2 | | | | | 2 | 2 | 2 | 2 | | 2 | 2 | 2 |
| Sodium lauryl sulfate | 1 | | | | | 1 | 1 | 1 | 1 | | 1 | 1 | 1 |
| Chlorinated polyethylene | | 5 | 3 | 2 | 7 | | | | | 5 | | | |
| Dibutyl tin dilauryl mercaptide | 2 | 2 | 2 | 2 | 2 | 2 | 2 | 2 | 2 | 2 | 2 | 2 | 2 |
| Calcium stearate | 1 | 1 | 1 | 1 | 1 | 1 | 1 | 1 | 1 | 1 | 1 | 2 | |
| N,N'-distearyl ethylene diamine | 2 | 2 | 2 | 2 | 2 | 2 | 2 | 2 | 2 | 2 | 2 | | 2 |
| Physical properties:[1] | | | | | | | | | | | | | |
| Impact strength at 25° C., foot pounds/inch of notch [2] | 18.0 | 19.0 | 16.0 | 19.1 | 21.6 | 22.3 | 16.0 | 19.9 | 13.5 | 21.2 | 20.9 | 20.1 | 18.9 |
| Tensile strength at yield, p.s.i. | 5,000 | 5,400 | 5,200 | 5,700 | 5,800 | 5,850 | 4,350 | 4,800 | 4,350 | 5,450 | 5,450 | | |
| Percent elongation at yield | 2.9 | 3.0 | 2.8 | 2.8 | 3.0 | 2.2 | 2.0 | 2.0 | 2.2 | 3.0 | 2.1 | | |
| Modulus at yield × $10^5$, p.s.i. | 2.8 | 3.0 | 2.8 | 3.1 | 3.0 | 3.7 | 2.9 | 3.1 | 2.7 | 3.0 | 3.3 | | |

[1] All properties measured by current ASTM methods. [2] Measured with a notch having a radius of curvature of 0.010 inch.

The vinyl chloride resin and the polyethylene elastomer included in the blends are the same polymers described in Example I. The styrene-butadiene elastomer is GR–S 1006 which is an interpolymer of 95.0 percent butadiene and 5.0 percent styrene. The polybutadiene elastomer has a molecular weight in excess of 1,000,000. The chlorinated polyethylene included in the blends as a compatibilizing agent contains about 45.0 percent chloride and, before chlorination, the polyethylene polymer has a molecular weight of about 20,000. Each of the blends is worked on the rubber mill for about fifteen minutes.

Part B

A series of six polymer blends identical with blends A, F, G, H, I and K of Table I are prepared except that polymer and (c) a compatibilizing agent that enhances the compatibility of the rigid vinyl chloride polymer and the non-polar hydrocarbon elastomer.

The proportions of the rigid vinyl chloride polymer and the non-polar hydrocarbon elastomer to be included in the polymer blends will depend primarily upon the properties desired in the blend. Where hard rigid materials suitable for use in the manufacture of pipe and similar items are desired, the polymer blends will contain about 70.0 to 98.0 parts of the rigid vinyl chloride polymer and, correspondingly, about 2.0 to 30.0 parts of the non-polar hydrocarbon elastomer. Rigid polymer blends of optimum properties will contain 80.0 to 98.0 parts of the rigid vinyl chloride polymer and, correspondingly, 20.0 to 2.0 parts of the non-polar hydrocarbon elastomer or more especially 85.0 to 98.0 parts of the rigid vinyl chloride polymer and, correspondingly, 15.0 to 2.0 parts of the non-polar hydrocarbon elastomer. It will be understood, of course, that the particular proportions of the two polymers to be included in such rigid polymer blends will be somewhat dependent upon the nature and characteristics of the individual polymers employed therein. Where elastic, rubbery and/or leather-like materials are desired, the polymer blends may contain about 10.0 to 79.0 parts of the rigid vinyl chloride polymer and, correspondingly, about 90.0 to 21.0 parts of the non-polar hydrocarbon elastomer.

The quantity of the compatibilizing agent included in the polymer blend will be sufficient to enhance the compatibility of the rigid vinyl chloride polymer and the non-polar hydrocarbon elastomer. The minimum quantity required for this purpose will depend somewhat upon the particular compatibilizing agent employed, but can be established through routine experimentation. Specifically, to determine the minimum quantity of the compatibilizing agent required, the blend of the rigid vinyl chloride polymer, the non-polar hydrocarbon elastomer and the compatibilizing agent should be worked for fifteen minutes on a two-roll rubber mill with the roll temperature being maintained at 340° Fahrenheit. The resulting blend then should be compared with a similarly worked control blend that contains no compatibilizing agent. In the case of blends containing at least 70.0 parts of the rigid vinyl chloride resin and less than 30.0 parts of the non-polar hydrocarbon elastomer, the blend containing the compatibilizing agent will have a higher Izod impact strength. The quantity of the compatibilizing agent employed should be such that the impact strength of the blend containing the compatibilizing agent is at least 0.5 foot pound per inch of notch higher than the impact strength of the control blend. In the case of blends containing less than 70.0 parts of the rigid vinyl chloride polymer and more than 30.0 parts of the non-polar hydrocarbon elastomer, the blend containing the compatibilizing agent will constitute 1.0 to 10.0 percent, and preferably 2.0 to 8.0 percent by weight of the blend.

The vinyl chloride polymer included in the polymer blends may be any rigid vinyl chloride polymer such as vinyl chloride homopolymers and interpolymers of vinyl chloride with interpolymerizable.

The vinyl chloride polymer included in the polymer blends may be any rigid vinyl chloride polymer such as vinyl chloride homopolymers and interpolymers of vinyl chloride with interpolymerizable monomers such as vinyl esters of organic acids containing one to eighteen atoms, e.g., vinyl acetate, vinyl stearate, etc.; vinylidene chloride; acrylonitrile; methacrylonitrile, alkyl acrylate esters in which the alkyl group contains one to eight carbon atoms, e.g., methyl acrylate and butyl acrylate; the corresponding alkyl methacrylate esters; dialkyl esters of dibasic organic acids in which the alkyl groups contain one to eight carbon atoms, e.g., dibutyl fumarate, diethyl maleate, etc. In general, where vinyl chloride interpolymers are employed, they should contain at least about 80.0 percent of vinyl chloride. To obtain optimum properties in the polymer blends, the vinyl chloride polymer included therein should have a relatively high molecular weight, e.g., the polymers should have a specific viscosity of at least about 0.4 as determined in a 0.4 percent by weight solution in cyclohexanone at 25° centigrade.

The non-polar hydrocarbon elastomer included in the polymer blend may be essentially any thermoplastic hydrocarbon polymer that has an elongation at break of at least 5.0 percent and that is essentially free of polar substituents such as halogen atoms, ester groups, amide groups, amine groups, nitrile groups, hydroxyl groups, carboxyl groups and the like. One class of such non-polar hydrocarbon elastomers consists of homopolymers of alpha-olefins such as ethylene, propylene, isobutylene and the like, interpolymers consisting solely of two or more such alpha-olefins and interpolymers of at least 85.0 percent by weight of such an alpha-olefin with up to 15.0 percent by weight of an interpolymerizable vinylidene monomer such as vinyl chloride, vinylidene chloride, vinyl acetate, alkyl acrylate esters such as methyl acrylate and butyl acrylate, the corresponding alkyl methacrylate esters, styrene, alpha-methylstyrene, ring-alkyl substituted styrenes, butadiene, isoprene and the like. Another class of suitable non-polar hydrocarbon elastomers consists of homopolymers of acyclic conjugated 1,3-dienes such as butadiene, isoprene, 2,3-dimethylbutadiene, piperylene and the like and interpolymers of such conjugated dienes which contain at least 50.0 percent by weight of the conjugated diene. The comonomers included in such conjugated diene interpolymers preferably are hydrocarbon monomers such as styrene, alpha-methylstyrene, ring-alkyl substituted styrenes and the like. In some cases, if desired, the rubbery diene interpolymer may contain up to about 10.0 percent by weight of a vinylidene monomer containing a polar substituent such as a halogen atom, an ester group, an amide group, an amine group, a nitrile group, a hydroxyl group, a carboxyl group or the like. Typical examples of such polar monomers include acrylonitrile, methacrylonitrile, alkyl acrylate esters such as methyl acrylate and butyl acrylate, the corresponding alkyl methacrylate esters, vinyl acetate, acrylic acid, methacrylic acid, acrylamide, methacrylamide, vinylidene chloride, vinyl pyridine, ring-alkyl substituted pyridines and the like.

The compatibilizing agent used in the polymer blends are surfactants. These surfactants may be of the cationic, anionic or non-ionic type. As is known, such surfactants contain both a hydrophobic group, i.e., a hydrocarbon chain containing about eight or more carbon atoms, and a hydrophilic group which may be a carboxyl group, a sulfoxy group, an amine group, a hydroxyl group, an amide group, a polyoxyethylene chain or the like.

Suitable anionic surfactants include metal and amine salts of eight to thirty carbon atom fatty acids such as calcium stearate, barium stearate, sodium laurate, ammonium oleate, the triethanolamine salt of coconut oil fatty acids, etc.; metal and amine salts of alkylsulfonic acids in which the alkyl group preferably contains eight to thirty atoms; metal and amine salts of sulfate esters of eight to thirty carbon atom fatty alcohols; metal and amine salts of long chain alkaryl sulfonates such as sodium dodecylbenzene sulfonate; and metal and amine salts of long chain alkyl sulfosuccinate esters such as N-octadecyl disodium sulfosuccinate.

Suitable non-ionic surfactants include esters formed by partially esterifying polyhydric alcohols with eight to thirty carbon atom fatty acids, e.g., ethylene glycol monolaurate, glyceryl monolaurate, pentaerythritol monolaurate, sorbitan monopalmitate, sorbitan monostearate, sorbitan distearate, etc.; ethylene oxide condensates of the partial esters of polyhydric esters above described; and ethylene oxide condensates of reactive hydrogen compounds containing eight or more carbon atoms in their structure, i.e., the long chain fatty alcohols such as lauryl alcohol and stearyl alcohol, the long chain fatty acids such as myristic acid and stearic acid, the rosin acids, long chain alkyl mercaptans such as dodecyl mercaptan, and alkylphenols such as nonylphenol. Another suitable class of non-ionic surfactants consists of the conjugated polyoxypropylene-polyoxyethylene compounds disclosed in United States Patents No. 2,674,619 and No. 2,677,700.

Cationic surfactants usable in the present invention include quaternary ammonium salts containing a long chain alkyl group such as cetyl pyridinium chloride and lauryl trimethyl ammonium bromide; amines such as lauryl amine, stearyl amine, rosin amine and N-dodecyl ethylene diamine; and amides such as oleoamide, stearyl amide and N-octadecyl acetamide.

For a list of additional surfactants that can be employed as a compatibilizing agent, see the comprehensive list of commercially available surfacants set forth by J. W. McCutcheon in the July, August, September and October 1955 issues of Soap and Chemical Specialties. In some cases, it is desirable to use a mixture of two or more surfactants as the compatibilizing agent. Particularly good results are obtained by using a mixture of an anionic surfactant such as a sodium salt of a sulfate ester of a long chain fatty alcohol, e.g., sodium lauryl sulfate, and a non-ionic surfactant such as glyceryl monostearate or sorbitan monostearate.

In addition to the rigid vinyl chloride polymer, the non-polar hydrocarbon elastomer and the compatibilizing agent, the polymer blends of this invention ordinarily will contain conventional stabilizers and antioxidants of the type employed with vinyl chloride polymers. If desired, colorants, lubricants, pigments, fillers, etc., may also be included in the polymer blends.

The rigid vinyl chloride polymer, the non-polar hydrocarbon elastomer and the compatibilizing agent may be blended together by being worked on conventional plastics working equipment such as rubber mills, Banbury mixers, extruders, etc. The blends should be worked at a temperature above that at which the vinyl chloride polymer fuses to obtain an intimate well-fused blend. Temperatures within the range of about 300 to 370° Fahrenheit are normally employed. If desired, it is also possible to prepare an aqueous dispersion of the three components, e.g., by mixing latices of the vinyl chloride polymer and the non-polar hydrocarbon elastomer and incorporating the compatibilizing agent in the mixed latices, and then coagulating and/or drying the dispersion to recover a blend of the three components. This procedure is particularly convenient to use when the compatibilizing agent that is to be included in the blend is at least one surfactant. In these situations, the surfactant can be employed as the emulsifying agent in the preparation of one or both of the polymers, i.e., the vinyl chloride polymer and the non-polar hydrocarbon elastomer. After the mixed polymers are recovered by this procedure, it is still necessary to heat the mixture for a short time while comalaxating the composition on some type of plastics working equipment.

The preferred polymer blends of the invention are those in which the non-polar hydrocarbon elastomer is a polymer of an alpha-olefin such as ethylene and particularly polyethylene. These polymer blends, in addition to having excellent physical properties, have outstanding resistance to oxidation and/or ultraviolet light. For this reason, such polymer blends are well adapted to be employed in the manufacture of articles which will be exposed to air and/or sunlight for extended periods of time.

EXAMPLE VI

A specimen of Polymer Blend A identified in Table I and a control polymer blend are placed within 1½ inches of a 40 watt fluorescent sunlamp which radiates strongly in the ultraviolet region of the spectrum (Westinghouse FS 40–T–12). The control polymer blend is identical in composition with Polymer Blend A except that a rubbery copolymer of about 79.0 percent butadiene and about 21.0 percent acrylonitrile is substituted for the polyethylene. The two polymer blends are examined visually at the end of seven, fourteen, twenty-one and twenty-eight day periods. Polymer Blend A is not discolored after seven, fourteen, twenty-one days and shows only a slight yellowing at the end of the twenty-eight day exposure. By way of contrast, the control polymer blend develops a very noticeable yellowing within seven days. This discoloration becomes progressively darkened with increased exposure and at the end of the twenty-eight day period, the control polymer blend is dark brown in color.

EXAMPLE VII

A mechanical blend was prepared containing 95.0 parts of vinyl chloride homopolymer, 4.0 parts polyethylene, 2.0 parts tin mercaptide stabilizer, 3.0 parts titanium dioxide, 1.0 part calcium stearate and 2.0 parts of N,N'-distearyl ethylene diamine.

After roll milling for fifteen minutes, the Izod impact strength was found to be 1.2 foot pounds per inch of notch.

EXAMPLE VIII

A mechanical blend was prepared containing 95.0 parts of vinyl chloride homopolymer, 5.0 parts polyethylene, 2.0 parts tin mercaptide stabilizer, 3.0 parts titanium dioxide, 1.0 part calcium stearate, 0.5 part N,N'-distearyl ethylene diamine and 4.0 parts of an acryloid resin processing aid sold by Rohm & Haas under the designation "K–120."

After roll milling for fifteen minutes, the Izod impact strength was found to be 3.1 foot pounds per inch of notch.

EXAMPLE IX

A mechanical blend was prepared containing 95.0 parts of vinyl chloride homopolymer, 5.0 parts polyethylene, 2.0 parts tin mercaptide stabilizer, 3.0 parts titanium dioxide, 1.0 part calcium stearate and 4.0 parts of an acryloid resin processing aid sold by Rohm & Haas under the designation "K–120."

After roll milling for fifteen minutes, the Izod impact strength was found to be 4.3 foot pounds per inch of notch.

The polymer blends of the invention can be molded, calendered or extruded into diverse shapes and forms such as rods, tubes, sheets, films, filaments, etc., by techniques well known in the polymer art. The rigid polymer blends, i.e., those containing at least 70.0 percent by weight of the rigid vinyl chloride polymer, have utility in many fields where vinyl chloride polymers of high impact strength are desired and especially in the manufacture of plastic pipe. The flexible polymer blends, i.e., those blends containing more than 30.0 percent by weight of the non-polar hydrocarbon elastomer, have utility as an electrical cable insulation material, as a film in the manufacture of shower curtains and similar items, etc.

The above descriptions and particularly the examples are set forth by way of illustration only. Many other variations and modifications thereof will be obvious to those skilled in the art and can be made without departing from the spirit and scope of the invention herein described.

What is claimed is:

1. A composition of matter consisting essentially of an intimate fusion blend having as the sole polymeric ingredients about 70.0 to 98.0 parts by weight of a rigid vinyl chloride polymer and, correspondingly, about 30.0 to 2.0 parts by weight of a non-polar hydrocarbon elastomer that is normally incompatible with said rigid vinyl chloride polymer and which has an elongation at break of at least 5 percent, said elastomer being selected from the group consisting of homopolymers of alpha-monoolefins; interpolymers of at least two alpha-monoolefins; interpolymers of at least 85.0 percent by weight of an alpha-monoolefin and up to 15.0 percent by weight of an interpolymerizable vinylidene monomer, homopolymers of acyclic conjugated 1,3-dienes, and interpolymers of at least 50.0 percent by weight of an acyclic conjugated 1,3-diene, up to 50.0 percent by weight of a hydrocarbon monomer selected from the group consisting of styrene, alpha-methylstyrene and ring-alkyl substituted styrenes, and up to 10.0 percent by weight of a vinylidene monomer having a polar substituent that is normally incompatible with said rigid vinyl chloride polymer; said composition also containing about 1.0 to 10.0 percent by weight of surfactant that is sufficient to enhance the compatibility of the rigid vinyl chloride polymer and the non-polar hydrocarbon elastomer to the extent of an improvement in Izod impact value of at least 0.5 foot pounds per inch of notch over the composition without such surfactant, said surfactant being selected from the group consisting of cationic, anionic and nonionic surfactants containing both a hydrophobic group and a hydrophilic group.

2. The composition of claim 1 wherein the non-polar elastomer is selected from the group consisting of homopolymers of alpha-monoolefins, interpolymers of at least two alpha-monoolefins and interpolymers of at least 85.0 percent by weight of an alpha-monoolefin and up to 15.0 percent by weight of an interpolymerizable vinylidene monomer.

3. The composition of claim 1 wherein the non-polar elastomer comprises homopolymers and interpolymers of acyclic conjugated 1,3-dienes.

4. The composition of claim 1 wherein said surfactant is N,N'-distearyl ethylene diamine.

5. The composition of claim 1 wherein said non-polar hydrocarbon elastomer is polyethylene.

References Cited

UNITED STATES PATENTS

| | | | |
|---|---|---|---|
| 2,464,855 | 3/1949 | Duggan et al. | 260—32.6 |
| 2,468,165 | 4/1949 | Brister et al. | 260—23 X |
| 2,739,082 | 3/1956 | Bezman et al. | 260—890 |

FOREIGN PATENTS 728,695  4/1955  Great Britain.

MURRAY TILLMAN, *Primary Examiner.*

M. J. TULLY, *Assistant Examiner.*